Figure 1:
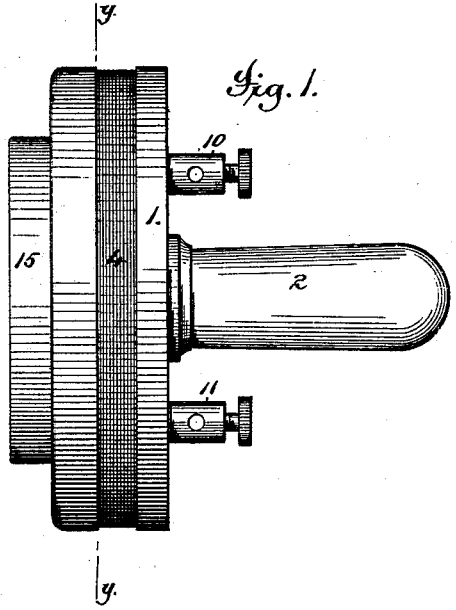

(No Model.)

D. W. DE FOREST.
TELEPHONE.

No. 245,919.         Patented Aug. 16, 1881.

Attest:
Geo. H. Graham
T. H. Palmer

Inventor,
David W. De Forest,
by Munson & Philipp
Att'ys.

N. PETERS. Photo-Lithographer. Washington, D. C.

UNITED STATES PATENT OFFICE.

DAVID W. DE FOREST, OF BROOKLYN, ASSIGNOR TO FRANK P. NORTON, OF STONEY BROOK, AND REON BARNES, OF WEST BRIGHTON, N. Y.

TELEPHONE.

SPECIFICATION forming part of Letters Patent No. 245,919, dated August 16, 1881.

Application filed May 6, 1881. (No model.)

*To all whom it may concern:*

Be it known that I, DAVID WILLIAM DE FOREST, a citizen of the United States, residing in the city of Brooklyn, county of Kings, and State of New York, have invented certain new and useful Improvements in Telephones, fully described and represented in the following specification and the accompanying drawings, forming a part of the same.

I have discovered that when a thin soft-iron diaphragm is placed within, and its periphery in proximity to, a series of coils of insulated wire in an electric circuit, the diaphragm becomes an electro-magnet and moves toward or from the pole of a stationary fixed magnet in proximity to it and its center, as the intensity of the current passing through the coils is increased or diminished or the undulations of the current vary, and that if such diaphragm so arranged is vibrated by the movements of the air caused by either speaking, singing, or playing a musical instrument in proximity to it, a current of electricity is induced in said coils that varies in intensity with the amplitude of the vibrations of the said diaphragm. I utilize this discovery or invention in telephones, as follows:

To produce an effective telephone-receiver I place a thin soft-iron diaphragm within, and with its periphery in close proximity to, a series of coils of insulated wire, a conductor of electricity, and connect the terminals of these coils with the circuit, in which is placed a transmitter—such as the Blake, the Edison, the Gray, or any other well-known form of transmitter in which variations of intensity of the current or undulating currents are produced, or a transmitter embodying my discovery—and place a fixed magnet with one pole in close proximity to and near the center of the diaphragm. The induced currents caused by the vibration of the diaphragm in the transmitter varying the intensity of the current, or its undulations passing through the coils within which the diaphragm of the receiver is placed, cause it, by thus increasing or diminishing its magnetic field, to move toward and from the pole of the fixed magnet in unison with the vibrations of the diaphragm of the transmitter, which causes a movement of the air in the receiver corresponding to that which moved the diaphragm of the transmitter, thus reproducing sounds, articulate speech, or music which caused such vibrations.

To produce a transmitter I arrange the coils, diaphragm, and fixed magnet as before described, and connect the terminals of the coils with the poles of a local battery connecting with the primary of an induction-coil, the secondary of which is in circuit with any well-known form of receiver, as the Bell, or other well-known practical receiver, or with the receiver before described embodying my discovery. The diaphragm of the transmitter, when vibrated by sounds, speaking, singing, or playing on a musical instrument in proximity to it, induces currents in the coils surrounding it varying in intensity with the amplitude of the vibrations of said diaphragm, which cause the diaphragm in the receiver to be moved toward and from the fixed magnet in unison with the vibrations of the diaphragm of the transmitter, which causes a movement of the air in the receiver corresponding to that which moved the diaphragm of the transmitter, thus reproducing sounds, articulate speech, or music which caused such vibrations.

With my discovery or invention an induction-coil with the transmitter may be dispensed with. I prefer, however, to use it, on account of the increased tension given to the current by it.

I have also discovered that more than one diaphragm can be used effectively in either the receiver or transmitter, provided they are separated so that they cannot come in contact when vibrating.

In the drawings I have shown one form of apparatus wherein my discovery or invention is utilized in a telephone receiver and transmitter.

Figure 2:
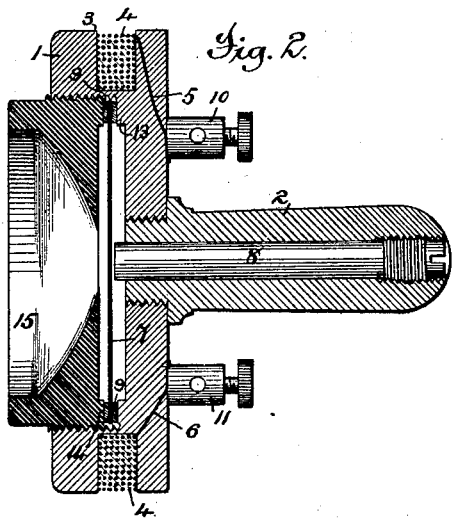
Figure 4:
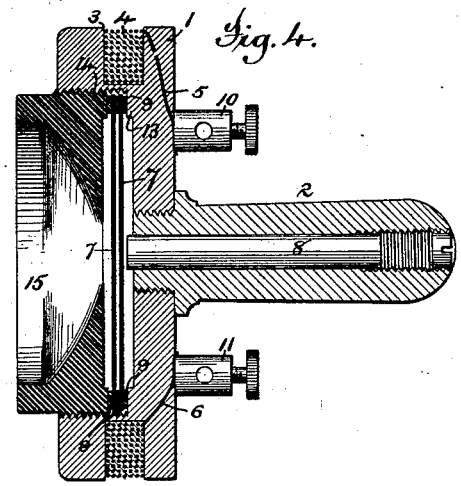
Figure 3:
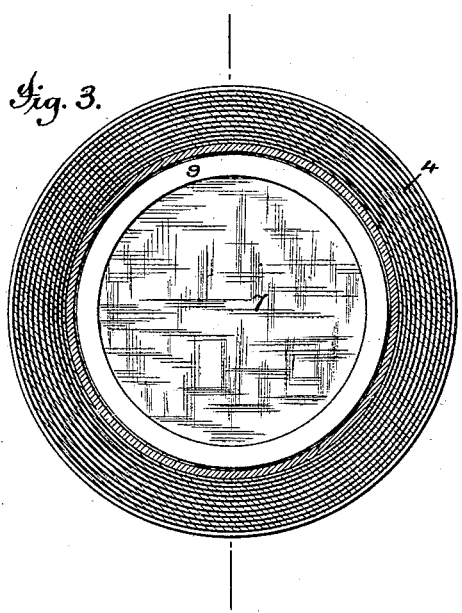

Figure 1 of said drawings represents a side elevation of said apparatus. Fig. 2 is a vertical longitudinal section of the same, as shown in Fig. 1. Fig. 3 is a transverse vertical section of the same on the line $yy$ of Fig. 1. Fig. 4 is a vertical longitudinal section of a modified form of said apparatus.

In said drawings, 1 is a plate made of some non-magnetic material, provided with a cored handle, 2, either removably connected, as shown in the drawings, or forming a part of the same.

10 11 are binding-posts, to which the terminals of the wires of an electrical circuit in which the transmitter and receiver are placed are secured.

3 is a groove in the plate 1, in which a series of coils, 4, of insulated wire, conductors of electricity, sufficient in number to magnetize the soft-iron diaphragm, hereinafter described, are wound in close proximity, the terminals 5 6 of these coils being connected, respectively, to the binding-posts 10 11.

Within a recess in the plate 1 is a soft-iron diaphragm, 7, preferably of the thickness of the diaphragms ordinarily used in speaking-telephones, which is about one sixty-fourth of an inch, but which may be considerably thicker or thinner than such diaphragms. This diaphragm, in its vibrations, is prevented from coming in contact with the bottom of the recess in the plate 1, except where it is held by a shoulder, 13, or a washer, 9, or both, and is held rigidly therein and against the plate 1, near its periphery, by a cone-shaped piece, 15, which is screwed into the plate 1, and prevented from interfering with the vibrations of the diaphragm 7 by a shoulder, 14, or a washer, 9, or both. The periphery of this diaphragm should be in close proximity to the series of coils 4.

Within the core of the handle 2 is preferably, in this apparatus, fixed a magnet, 8, which, as shown in the drawings, is of steel properly magnetized, capable of adjustment by means of a screw cut on one end fitting threads in the core, the inner end of which is in close proximity to the diaphragm 7, the proper distance to produce the best effects in the use of the apparatus being determined by trial. This magnet may, however, be an electro-magnet, the coils of which are in a separate circuit of a local battery.

In using this apparatus as a receiver for sound, the binding-posts 5 and 6 are preferably connected, respectively, with the terminals of the secondary of an induction-coil, the primary of which is in a circuit of a local battery, in which circuit any well-known transmitter—such as the Blake, Gray, or Edison, or a duplicate of the receiver containing my discovery—acting as a transmitter, is placed. The vibrations of the diaphragm in such transmitter caused by the movements of the air in speaking, singing, or playing a musical instrument in proximity to said diaphragm of the transmitter, induce currents of intensity varying with the amplitudes of vibrations of the diaphragms, which, in the receiver passing through the coils 4, cause the diaphragm 7 to move toward or from the pole of the fixed magnet 8 in unison with the vibrations of the diaphragm in the transmitter, which causes articulate speech or music to be reproduced in the receiver.

When the apparatus shown in the drawings is used as a transmitter the binding-posts 10 11 are connected, respectively, with the terminals of the primary of an induction-coil in a circuit with a local battery, the terminals of the secondary being connected with the terminals of the coil of the electro-magnet of an ordinary Bell or other practical receiver, or with the binding-posts 10 11 of a receiver embodying my discovery. The vibrations of the diaphragm 7 in this transmitter induce currents of intensity varying with the amplitude of its vibrations, which, passing through the coils of the electro-magnet of the Bell receiver or the coils 4 of a receiver embodying my invention, cause the diaphragm in either of said receivers to vibrate in unison with that of the diaphragm of the transmitter, and thus reproduce the sounds that caused said diaphragm in the transmitter to vibrate.

Although I prefer to use an induction-coil with the transmitter, such coil may be dispensed with in the use of the apparatus embodying my discovery or invention as a receiver or transmitter.

In either the transmitter or receiver two or more diaphragms can be employed with good results instead of one in the apparatus, and still embody my discovery or invention, provided they are separated, as shown in the drawings, by washers that prevent them from coming in contact when vibrating in use. I have illustrated one form of this modification in Fig. 4 of the drawings.

My discovery or invention is applicable to other objects than telephones, and I do not, therefore, restrict it entirely to them.

The apparatus shown in the drawings may be varied in construction within wide limits, and still embody my discovery or invention.

Having thus described my discovery or invention, what I claim as new, and desire to secure by Letters Patent, is—

1. The combination of a series of insulated coils in an electric circuit with a soft-iron diaphragm, or more than one, within said coils, and a fixed magnet, substantially as described.

2. In a telephonic receiver or transmitter, the combination of a series of insulated coils in an electric circuit with a soft-iron diaphragm, or more than one, within said coils, and a fixed magnet, substantially as described.

3. The combination, in a telephonic receiver or transmitter, of a plate, 1, provided with a handle, 2, coils 4, a soft-iron diaphragm, 7, or more than one, within said coils, a fixed magnet, 8, and a cone-shaped piece, 15, substantially as described.

4. The combination, in a telephonic receiver or transmitter, of coils 4, two or more separated diaphragms within said coils, and a fixed magnet, substantially as described.

In testimony whereof I have hereunto set my hand in the presence of two subscribing witnesses.

DAVID WILLIAM DE FOREST.

Witnesses:
  M. B. PHILIPP,
  T. H. PALMER.